United States Patent
Kim et al.

(10) Patent No.: US 6,219,724 B1
(45) Date of Patent: Apr. 17, 2001

(54) DIRECT MEMORY ACCESS CONTROLLER

(75) Inventors: Sang Beom Kim; Dae Nyung Chun; Ki Hyun Kim; Jang Sik Choi; Seung Ku Hwang; Chee Hang Park, all of Daejon-Shi (KR)

(73) Assignee: Electronics and Telecommunications Research Institute, Daejon-Shi (KR)

( * ) Notice: Subject to any disclaimer, the term of this patent is extended or adjusted under 35 U.S.C. 154(b) by 0 days.

(21) Appl. No.: 09/145,331

(22) Filed: Sep. 1, 1998

(30) Foreign Application Priority Data

Nov. 29, 1997 (KR) ................................. 97-64815

(51) Int. Cl.[7] ................................................. G06F 13/00
(52) U.S. Cl. ............................................. 710/22; 710/129
(58) Field of Search ........................... 710/22–40, 53, 710/112–131

(56) References Cited

U.S. PATENT DOCUMENTS

| 5,590,377 | * | 12/1996 | Smith | 710/22 |
|---|---|---|---|---|
| 5,621,902 | | 4/1997 | Cases et al. | 710/129 |
| 5,623,697 | | 4/1997 | Bland et al. | 710/22 |
| 5,623,700 | | 4/1997 | Parks et al. | 710/53 |
| 5,717,873 | * | 2/1998 | Rabe et al. | 710/110 |
| 5,802,269 | * | 9/1998 | Poisner et al. | 714/44 |
| 5,875,351 | * | 2/1999 | Riley | 710/22 |
| 5,878,239 | * | 3/1999 | Furuta | 710/129 |
| 5,884,051 | * | 3/1999 | Schaffer et al. | 710/107 |
| 5,963,717 | * | 10/1999 | Imamura | 358/1.15 |
| 5,991,304 | * | 11/1999 | Abramson | 370/413 |
| 6,000,043 | * | 12/1999 | Abramson | 714/44 |
| 6,088,517 | * | 7/2000 | Wanner et al. | 395/290 |

* cited by examiner

Primary Examiner—Christopher B. Shin
(74) Attorney, Agent, or Firm—Jacobson, Price, Holman & Stern, PLLC

(57) ABSTRACT

The present invention relates to a direct memory access controller, specifically to a direct memory access controller which controls the direct memory access between internal modules and high speed external memories such as SDRAM (Synchronous Dynamic RAM) in high speed digital signal processors having burst transmission feature. The direct memory access controller comprises a plurality of direct memory access controller circuits, a direct memory access bus arbiter, and a direct memory access bus bridge connecting a direct memory access master bus and a direct memory access slave bus and providing a data transmission path between external high speed memories and input/output devices according to a signal from the direct memory access controller which is connected to said master bus.

2 Claims, 5 Drawing Sheets

DIRECT MEMORY ACCESS CONTROLLER

BACKGROUND OF THE INVENTION

1. Field of the Invention

The present invention relates to a direct memory access controller, specifically to a direct memory access controller which controls the direct memory access between internal modules and high speed external memories such as SDRAM (Synchronous Dynamic RAM) in high speed digital signal processors having burst transmission feature.

2. Description of the Prior Art

Referring to FIG. 1a and FIG. 1b, the prior art direct memory access scheme of multimedia processors having parallel processing structure using a plurality of processing modules and high speed external memories such as SDRAM for image compression/decompression will be explained.

FIG. 1a is a diagram of the prior art fly-by type direct memory access control scheme which is used in IBM compatible computers. In the fly-by type scheme, the direct memory access controller 1 applies address and control signal to the target memory 3 and at the same time sends control signals to the input/output device 2. The input/output device 2 has an input/output structure which complies to the direct memory access request signal 5 and the direct memory access response signal 6 and in which the address signal is ignored.

FIG. 1b is a diagram of the prior art flow-through type direct memory access scheme which is used in Intel 80186 processors. In the flow-through type scheme, the direct memory access controller has the same interface as that of the general CPU, and uses two input/output actions, i.e. writing the data from the read action is stored in a temporary memory 4 in the direct memory access controller 1, and then write action is performed to transmit data.

In the fly-by type scheme, there is no delay in burst transmission because data is transmitted while the memory 1 and the input/output device 2 is connected directly. But, an additional interface for direct memory access transmission in the input/output device 2 is required.

The flow-through type has a simple interface but requires twice of transmission cycles compared to the fly-by type. Further, it requires a temporary memory as long as the length of the burst to be connected to the burst memories like SDRAM which is operated at the same speed as the system bus.

SUMMARY OF THE INVENTION

It is an object of the present invention to provide a direct memory access controller which can be used in multimedia processors which process data in parallel using a plurality of processing modules at the same time for the image compression/decompression.

The direct memory access controller according to the present invention comprises a plurality of direct memory access controller circuits, a direct memory access bus arbiter, and a direct memory access bus bridge connecting a direct memory access master bus and a direct memory access slave bus and providing a data transmission path between external high speed memories and input/output devices according to a signal from the direct memory access controller which is connected to the master bus.

BRIEF DESCRIPTION OF THE DRAWINGS

The objects, features and advantages of the present invention will be apparent to one skilled in the art from the following detailed description in conjunction with the accompanying drawings, in which.

Similar reference characters refer to similar parts in the several views of the drawings.

DETAILED DESCRIPTION

Now, detailed description of the present invention follows referring to the attached figures.

Figure 1A:
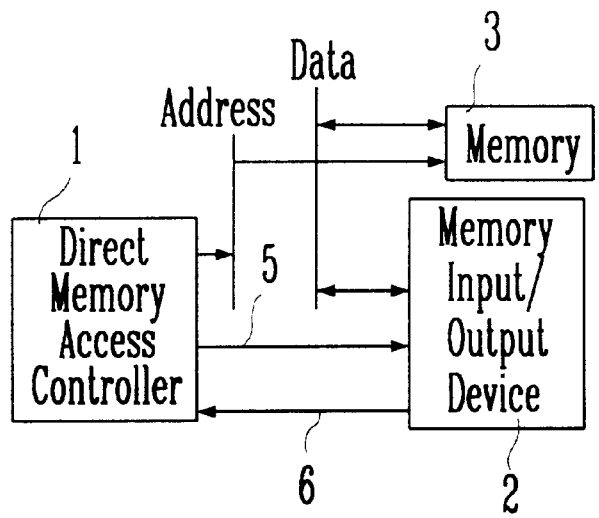
FIG. 1a is a diagram of the prior art fly-by type direct memory access control scheme.
Figure 1B:
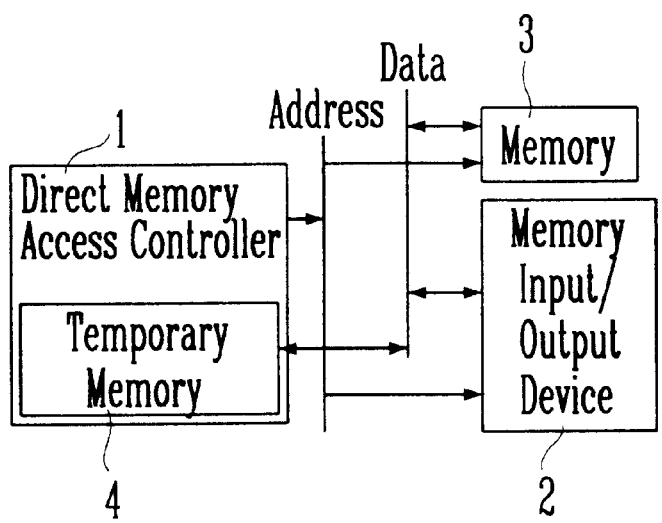
FIG. 1b is a diagram of the prior art flow-through type direct memory access scheme.
Figure 2:
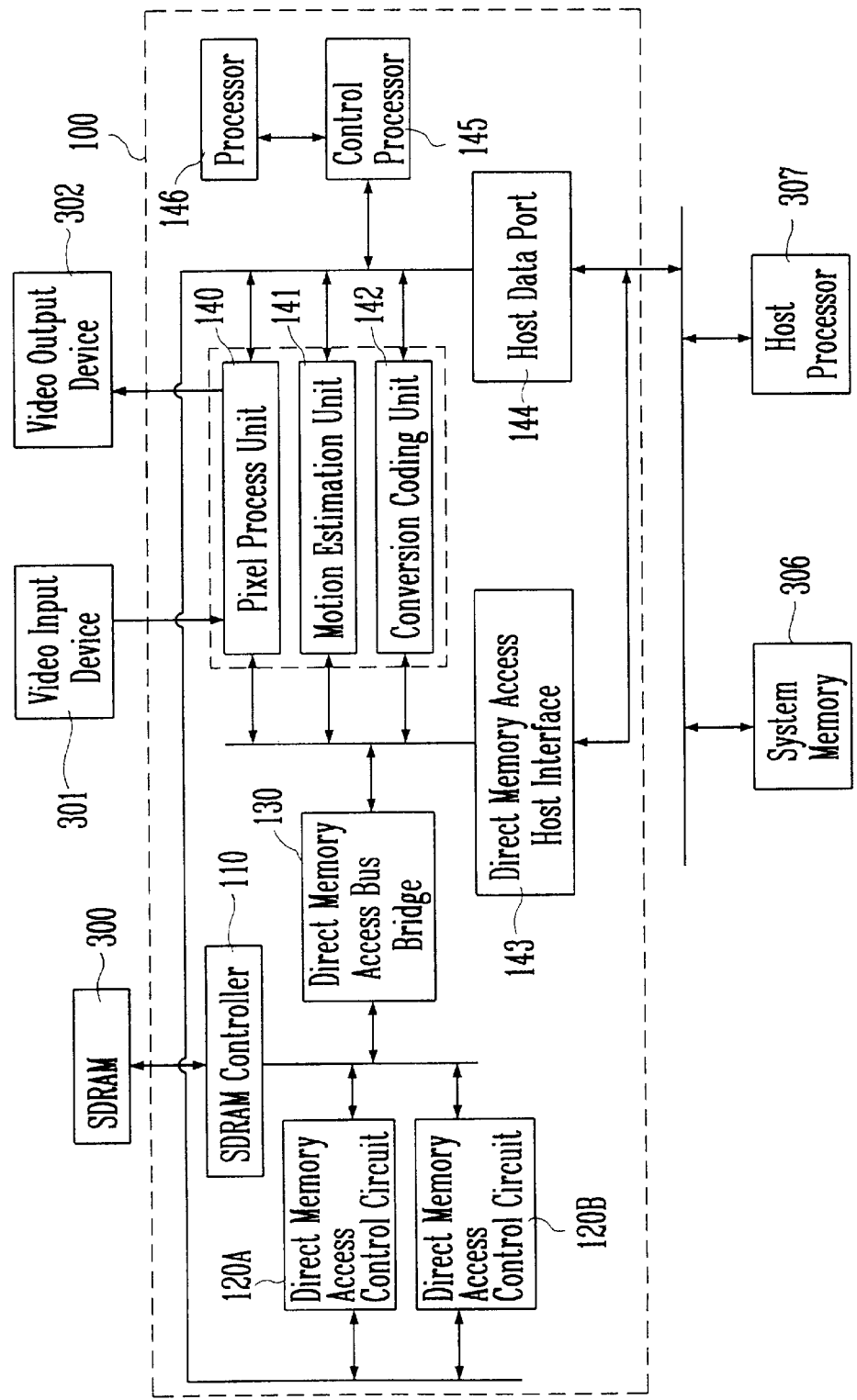
FIG. 2 is a structural diagram of the direct memory access transmission using the direct memory access controller of the present invention.

Referring to FIG. 2, for the direct memory access transmission scheme and structure which is used in the multimedia processor 100 which processes data in parallel using a plurality of processing modules 140, 141, 142 at the same time for the image compression/decompression, the following properties are required.

There are a lot of data to be processed in the image processing, and they are often processed by consecutive pipelines. In the image compression process of the present invention, most data are stored in the memory external to the chip. For the high speed transmission, a direct memory access transmitter is provided. An SDRAM 300 is used as the external memory. The SDRAM is operated in synchronization with the same clock for the processing elements inside the chip. There is no delay because it can access the synchronized data continuously every clock. The formats of the data to be stored is largely divided into an one-dimensional format such as compression-coded data and a two-dimensional format such as image data. In the image compression/decompression processor of the present invention, the direct memory access transmitter uses a module-type direct memory access controller 120A for one-dimensional data transmission and a module-type direct memory access controller 120B for two-dimensional data transmission so that it can accommodate a plurality of various direct memory access requests and allow extendibility. Also it uses a direct memory access bus bridge 130 in order to allow input/output devices to be connected with an interface same as that of the general CPU without any temporary memory and to transmit high-speed data continuously.

Figure 3:
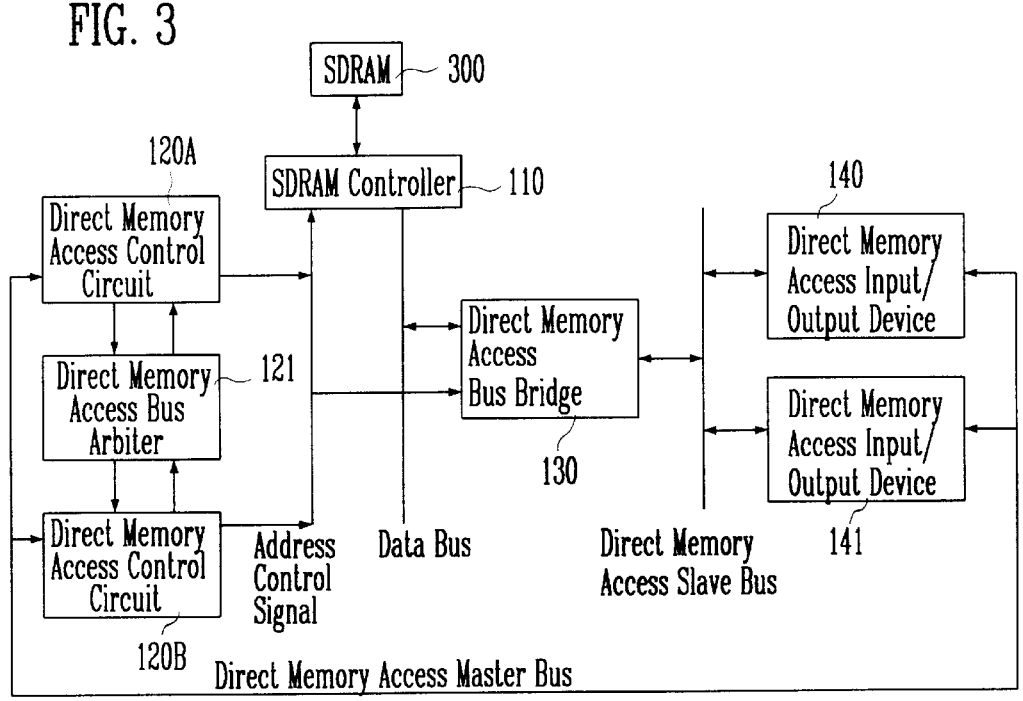
FIG. 3 is a structural diagram of the direct memory access controller which uses the direct memory access bus bridge of the present invention.

FIG. 3 is a structural diagram of the direct memory access controller which uses the direct memory access bus bridge of the present invention. The direct memory access controller comprises a direct memory access bus bridge 130, a direct memory access control circuits 120A, 120B, a direct memory access arbiter 121, an SDRAM controller 110, and direct memory access input/output devices 140, 141. The direct memory access bus bridge 130 connects a direct memory access master bus and a direct memory access slave bus. It provides a data transmission path between the SDRAM controller 110 and the input/output devices 140, 141 according to the signal from the direct memory access controller connected directly to the master bus.

Figure 4:
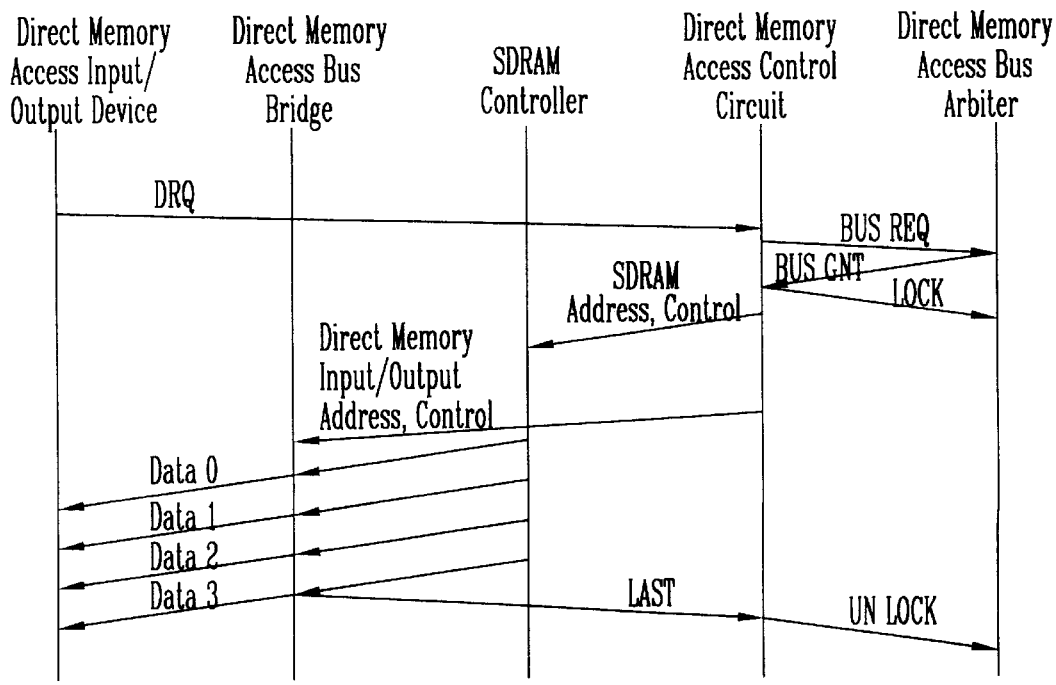
FIG. 4 is a timing diagram of the direct memory access transmission in SDRAM read mode according to the present invention.

FIG.4 is a timing diagram of the direct memory access transmission in SDRAM read mode according to the present invention, and shows control signals and data move procedure when reading data from the external memory 300 depicted in FIG.3 and sending them to the internal processing units 140, 141.

More specifically, if one of the processing units sends a direct memory access request directly to the direct memory access control circuit, the direct memory access control circuit checks if it has a sovereignty for the direct memory access master bus. If not, it requests the direct memory access bus arbiter a sovereignty of the bus. Having acquired the sovereignty, it informs the bus arbiter that it is using the bus, and sends control signals such as the start address, the length of the burst transmission and the transmission direction to the SDRAM controller. The SDRAM controller sends a control signal for accessing the SDRAM. After some delay, the SDRAM outputs data of the length of the burst transmission in synchronization with a clock. In this SDRAM read operation, normally 2 to 6 cycles of delay time is required according to the operation mode of the SDRAM to get first data after sending the control signal of the read mode. Therefore, the direct memory access control circuit sends control signals such as the address of the processing unit, the length of the burst transmission, and the direction of the transmission to the direct memory access bus bridge after some delay so that it can be in synchronization with the data read from the SDRAM. According to the control signal from the direct memory access control circuit, the direct memory access bus bridge activates the direct memory access slave bus during the burst transmission and generates control signals so that the processing unit can receive data. After the completion of the last data transmission, it sends an end signal to the direct memory access control circuit and deactivates the direct memory access slave bus. The direct memory access control circuit then informs the direct memory access bus arbiter that it completed the use of the direct memory access master bus.

Figure 5:
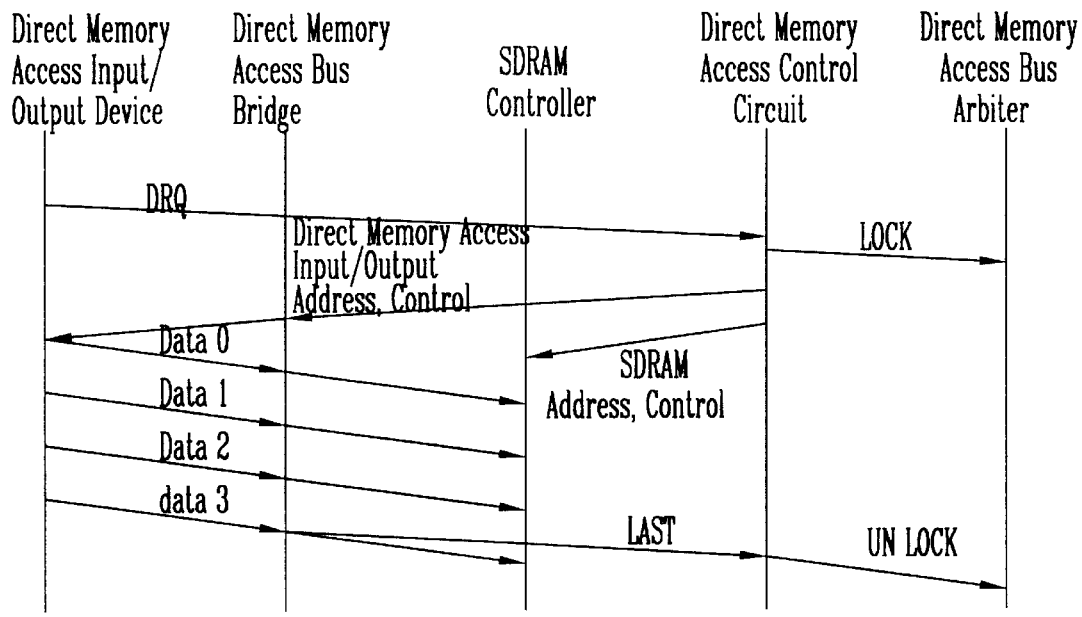
FIG. 5 is a timing diagram of the direct memory access transmission in SDRAM write mode according to the present invention.

FIG. 5 is a timing diagram of the direct memory access transmission in SDRAM write mode according to the present invention and it illustrates the procedure of direct memory access transmission of data to from the processing units 140, 141 depicted in FIG. 3 to the external memory 300.

More specifically, when one of the processing units sends a direct memory access request to the direct memory access control circuit, the direct memory access control circuit checks the sovereignty of the direct memory access master bus. Then, if the direct memory access control circuit itself has the sovereignty it inform the bus arbiter that it is using the bus and sends control signals such as the address of the processing unit, the length of the burst transmission, and the direction of the transmission to the direct memory access bus bridge. Then, it sends control signals such as the start address of the data to be stored, the length of the burst transmission, and the direction of the transmission to the SDRAM controller. The write operation of the SDRAM has shorter delay time than the read operation. As 1 to 3 cycles are used for the data read by the processing unit to be synchronized with the write control signal of the SDRAM, it applies the read signal to the direct memory access bus bridge, and then applies the write control signal to the SDRAM controller to achieve synchronization of the data. After the completion of the last data transmission, the direct memory access bus bridge sends an end signal to the direct memory access control circuit, which in turn informs the direct memory access bus arbiter that the use of the direct memory access master bus has been completed.

Figure 6:
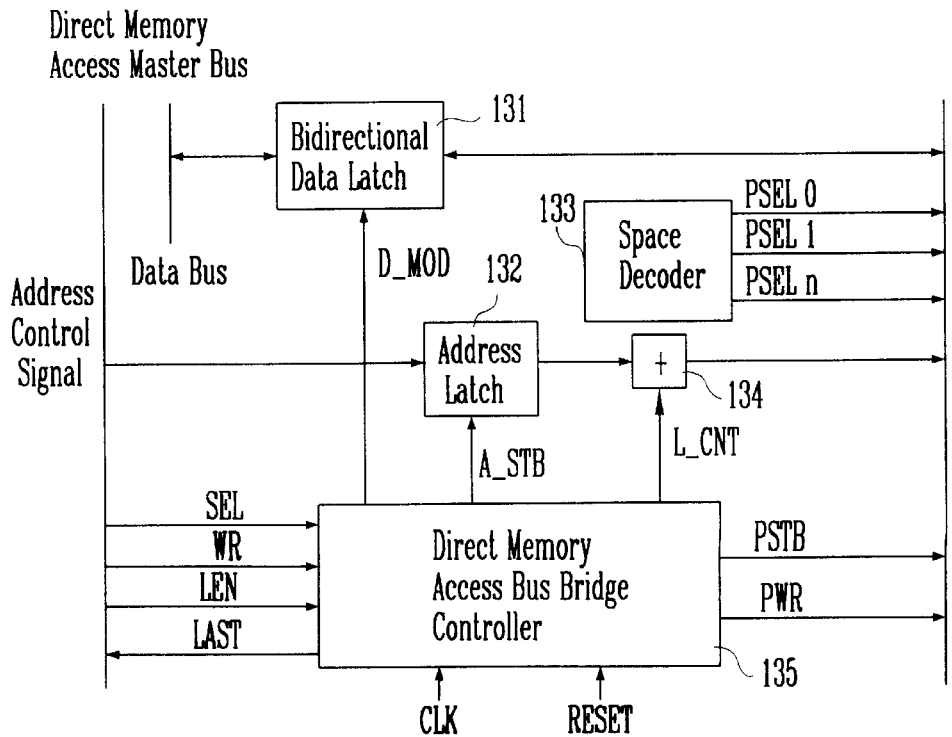
FIG. 6 is a block diagram of the direct memory access bus bridge according to the present invention.

FIG. 6 is a block diagram of the direct memory access bus bridge according to the present invention. The direct memory access bus bridge 130 comprises an address path composed of a bidirectional data latch 131, an address latch 132, an address generator 134, and a space decoder 133, and a direct memory access bus bridge controller 135. The operating mode of the direct memory access bus bridge is determined by the control of the direct memory access control circuit connected to the direct memory access master bus.

Figure 7:
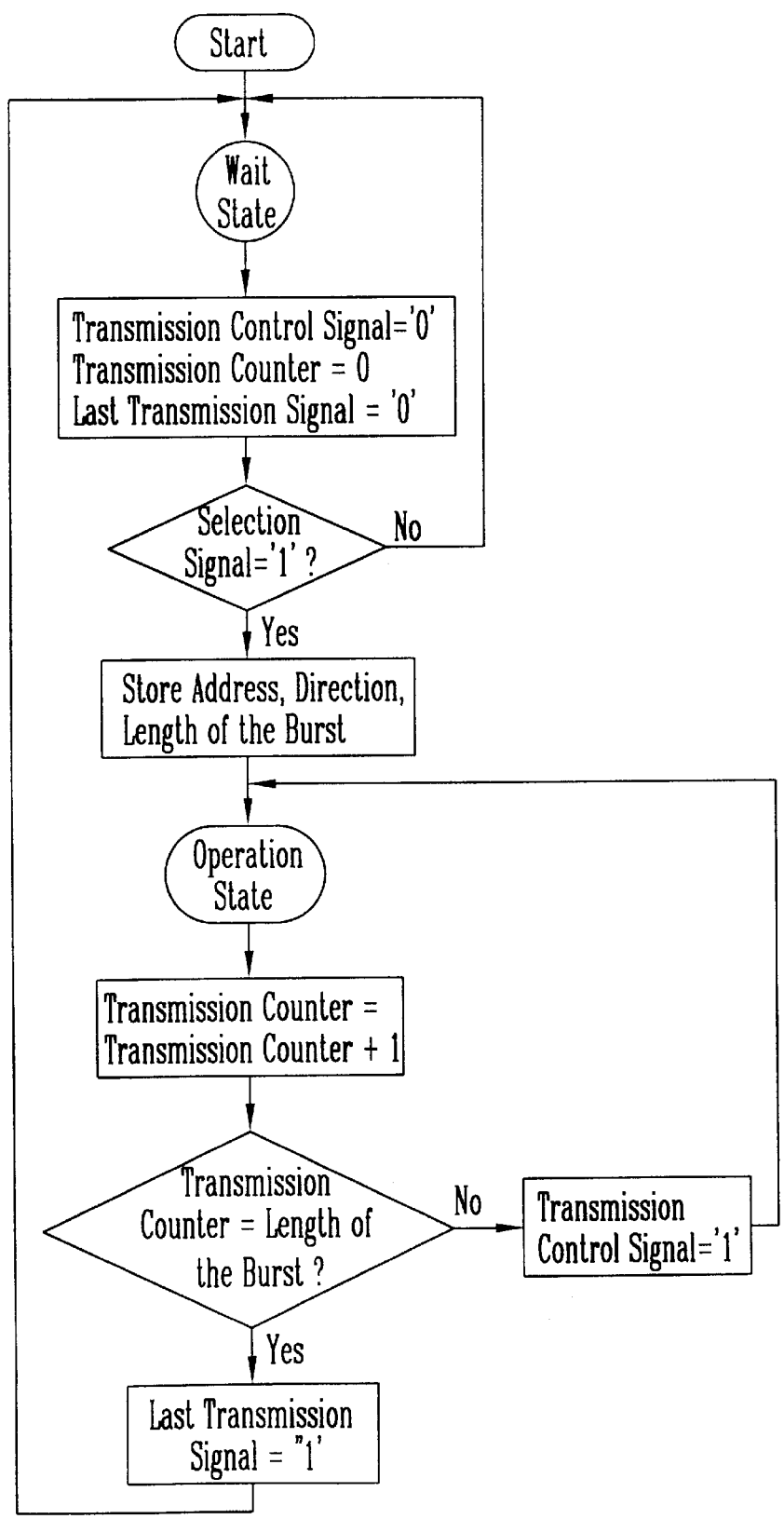
FIG. 7 is a state diagram of the direct memory access bus bridge controller according to the present invention.

FIG. 7 is a state diagram of the direct memory access bus bridge controller 135 according to the present invention. The operating mode is largely divided into the wait state S0 and the active state S1. In the wait state, after the current transmission counter L-CNT and the last transmission signal LAST is initialized, the address ADR, the direction WR and the length of the burst B_LEN is stored and the active state begins if the select signal SEL comes in. Otherwise, operations in the wait state is repeated. In the active state, the transmission counter is increased by one, and the current transmission counter and the size of the burst transmission are checked if they coincide. If they do, the last transmission signal LAST is set to one, and the wait state begins. Otherwise, the transmission control signal is activated and the active state continues.

As described above, the present invention provides flexibility and minimizes the data transmission delay in connecting a plurality of direct memory access control circuits and a plurality of direct memory access channels by using a direct memory access bus bridge circuit in the direct memory access burst transmission. Particularly, as the direct memory access input/output devices are connected to the direct memory access controller and the CPU by using the same interface as that of the general CPU, no special direct memory access control circuits are required. In the design of the direct memory access controller, instead of designing a complicated direct memory access controller, by making the direct memory access controllers available in module types which are adapted to the characteristics of transmission channels, extendibility is enhanced. Further, a common data path can be used. Also, as it isolates the data path in connecting a plurality of input/output devices and the direct memory access controller, high-speed transmission is made possible.

The foregoing description, although described in its preferred embodiment with a certain degree of particularity, is only illustrative of the principles of the present invention. It is to be understood that the present invention is not to be limited to the preferred embodiments disclosed and illustrated herein. Accordingly, all expedient variations that may be made within the scope and the spirit of the present invention are to be encompassed as further embodiments of the present invention.

What is claimed is:

1. A direct memory access controller comprising:
   a plurality of direct memory access control; circuits
   a direct memory access bus arbiter; and
   a direct memory access bus bridge connecting a direct memory access master bus and a direct memory access slave bus and providing a data transmission path between external high speed memories and input/output devices according to a signal output from said plurality of direct memory access control circuits which are connected to said master bus, said direct memory access bus bridge including, a bus bridge controller receiving a signal from said direct memory access master bus and generating a control signal;

a bi-directional data latch converting a transmission direction according to the control signal;

an address latch storing a start address according to the control signal;

a space decoder decoding the address stored in said address latch; and an adder adding the start address and a transmission counter value applied from said bus bridge controller to make an effective address of the input/output device.

2. A direct memory access controller comprising:

a direct memory access control circuit;

a direct memory access bus arbiter; and a direct memory access bus bridge connecting a direct memory access master bus and a direct memory access slave bus and providing a data transmission path between external high speed memories and input/output devices according to a signal output from said direct memory access control circuit which is connected to said master bus, said direct memory access bus bridge including, a bus bridge controller receiving a signal from said direct memory access master bus and generating a control signal;

an address latch storing a start address according to the control signal;

a space decoder decoding the address stored in said address latch; and an adder adding the start address and a transmission counter value applied from said bus bridge controller to make an effective address of the input/output device.

* * * * *